United States Patent [19]

Renth

[11] Patent Number: 4,648,202

[45] Date of Patent: Mar. 10, 1987

[54] METHOD AND APPARATUS FOR INJECTION APPLICATION OF INSECTICIDE

[76] Inventor: Lawrence B. Renth, 4825 NW. 75th St., Oklahoma City, Okla. 73132

[21] Appl. No.: 782,095

[22] Filed: Sep. 30, 1985

[51] Int. Cl.[4] ................................ A01M 7/00

[52] U.S. Cl. ................................ 43/132.1; 43/124

[58] Field of Search ................ 43/124, 129, 132.1; 52/101; 239/271, 302, 307, 345

[56] References Cited

U.S. PATENT DOCUMENTS 1,106,679 8/1914 Randall ................ 239/271
1,248,181 11/1917 Sidwell, Jr. .
1,583,900 5/1926 Schmittutz ................ 43/124
1,728,837 9/1929 Slayter .
2,116,591 5/1938 Barber ................ 43/124
2,413,083 12/1946 Snowden et al. ................ 239/271
2,440,921 5/1948 Stephens ................ 239/271
2,813,753 11/1957 Roberts ................ 239/271
3,892,360 7/1975 Schlottmann et al. ................ 239/379
4,485,877 12/1984 McMillan et al. ................ 239/271
4,553,698 11/1985 Parker et al. ................ 239/3

*Primary Examiner*—M. Jordan
*Attorney, Agent, or Firm*—Laney, Dougherty, Hessin & Beavers

[57] ABSTRACT

A method and apparatus for dispensing selected amounts of insecticide through a needle into building structure void spaces. The apparatus includes a needle tube with elongated opening and an applicator for pneumatically forcing metered amounts of insecticide through the needle tube for release within the void space. The needle may be non-destructively inserted through various forms of wall panel members without necessitating remedial measures.

11 Claims, 6 Drawing Figures

METHOD AND APPARATUS FOR INJECTION APPLICATION OF INSECTICIDE

BACKGROUND OF THE INVENTION

1. Field of the Invention

The present invention relates to the application of insecticides by injection into an affected situs and more particularly, but not by way of limitation, it relates to method and apparatus for injection of metered amounts of dust insecticide, pesticide or blatticide into an infected area that is normally enclosed by wallboard, paneling or the like.

2. Description of the Prior Art

The prior art methods of applying insecticides within building structures have been the well-known practices of spraying or dusting the insecticide material within all accessible areas of the interior of the building and, in some cases, holes are drilled to allow further access to the closed spaces such as inter-stud and other interior void spaces that are closed over by wall covering, ceiling materials and the like. It has been known in the prior art to include an insecticide-type material in certain types of foam plastic information that is then deposited within building void spaces. The U.S. Pat. No. 3,619,437, to McDonald, teaches a hose-type injection for placing insulation through a wallboard, sheetrock or such, and in this case the insulation itself is a urea-formaldehyde foam that also has the property of being a repellent for certain types of parasite. In this method, a hole must be formed in the wall or ceiling panel for insertion of a suitable spray nozzle.

There are still other prior patent teachings that relate more specifically to pesticidal practice relative to building void space treatment. U.S. Pat. No. 1,248,181 in the name of Sidwell describes the use of a wallboard that has been previously impregnated with a vermin repellent. This teaching relates to initial formation of wallboard along with selected additive components which react over a period of time to form a vermin-proofing-organic material.

Finally, U.S. Pat. No. 1,728,837 in the name of Slayter teaches another form of spray-applied insulation wherein a fungicide is added. The insulation is a ground corncob filler that is applied in building void space disposition through a nozzle introduced by means of an access hole into a dead air compartment. It would appear that the fungicide is applied for the purpose of protecting the organic corncob filler for long duration usage as opposed to any form of pesticidal protection of the building structure itself.

SUMMARY OF THE INVENTION

The present invention is directed to the pneumatic application of dust insecticide into building void dead air spaces without the necessity for boring or otherwise forming access holes that interrupt the integrity of the building wall covering, ceiling panel or the like. The method utilCizes a manually controlled apparatus that operates from a source of air pressure to inject successive metered amounts of insecticide through a needle applicator. The needle applicator is formed so that it can be easily forced through most wall or ceiling covering materials and thereafter removed without leaving a noticeable hole that necessitates filling or otherwise refinishing. When inserted, the applicator needle is formed to allow insecticide release within the dead air space, and an operator may continually insert, introduce insecticide and withdraw the applicator needle a multiple of times in selected spacing along a designated wall or ceiling space. The applicator is manually operated and adapted for use in combination with a commercially available type of dust insecticide, as it includes a barrel actuator that serves both to meter and to effect air expulsion of the dust insecticide.

Therefore, it is an object of the present invention to provide a relatively portable apparatus that enables quick insecticide treatment of building structure dead air spaces.

It is also an object of the invention to provide a method and apparatus for blatticide application that is most effective in eradication of cockroaches.

It is still further an object of the invention to provide a manually operated needle applicator for reliable use in household pest extermination.

It is yet another an object of the invention to provide a dust applicator device that is co-active with a commercially available packaged form of insecticide.

Finally, it is an object of the present invention to provide quick and economical roach extermination that is effective within the voids of building structures for long duration.

Other objects and advantages of the invention will be evident from the following detailed description when read in conjunction with the accompanying drawings which illustrate the invention.

DETAILED DESCRIPTION OF THE INVENTION

Figure 1:
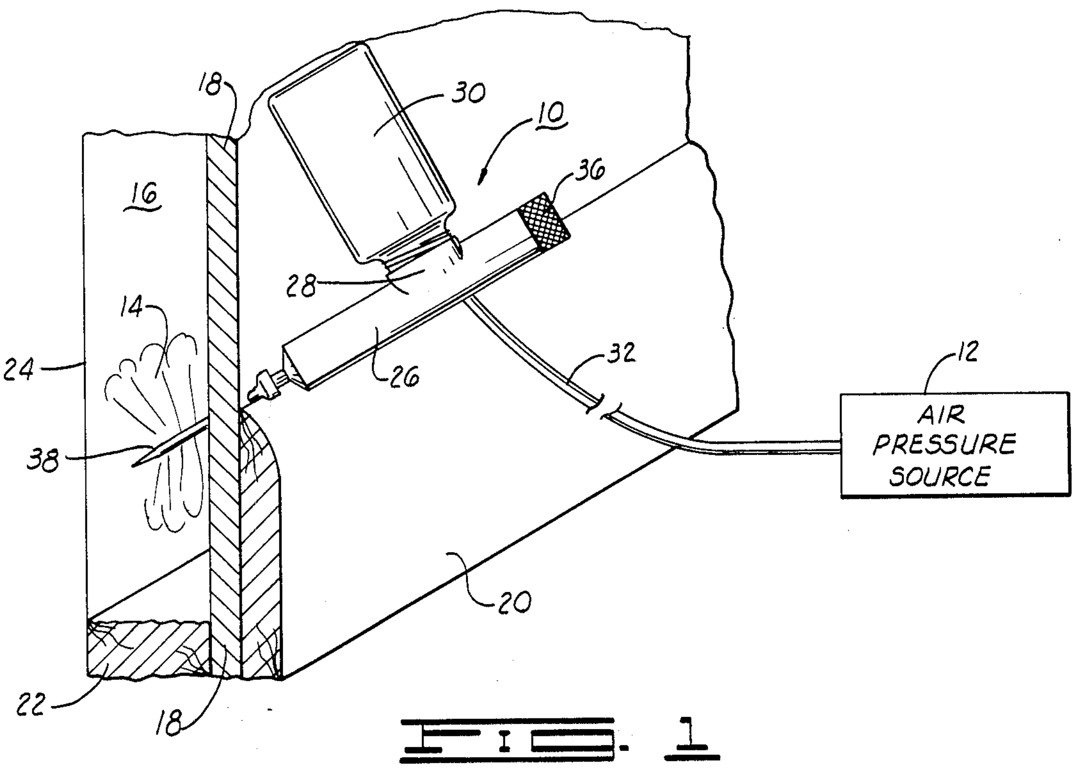
FIG. 1 is a perspective view in partial section showing the use of a dust applicator relative to a building structure void space.

FIG. 1 illustrates the use of a dust applicator 10 functioning with a suitable air pressure source 12 for periodic release of an insecticidal dust 14 within a dead air space 16 formed behind a wall cover 18. For example, void space 16 may be such as is formed conventionally between vertical structural supports and bounded by wall cover 18, some form of baseboard 20, foot brace 22 and backing member 24. Similar spaces may exist behind ceiling paneling and other structural elements.

Figure 2:
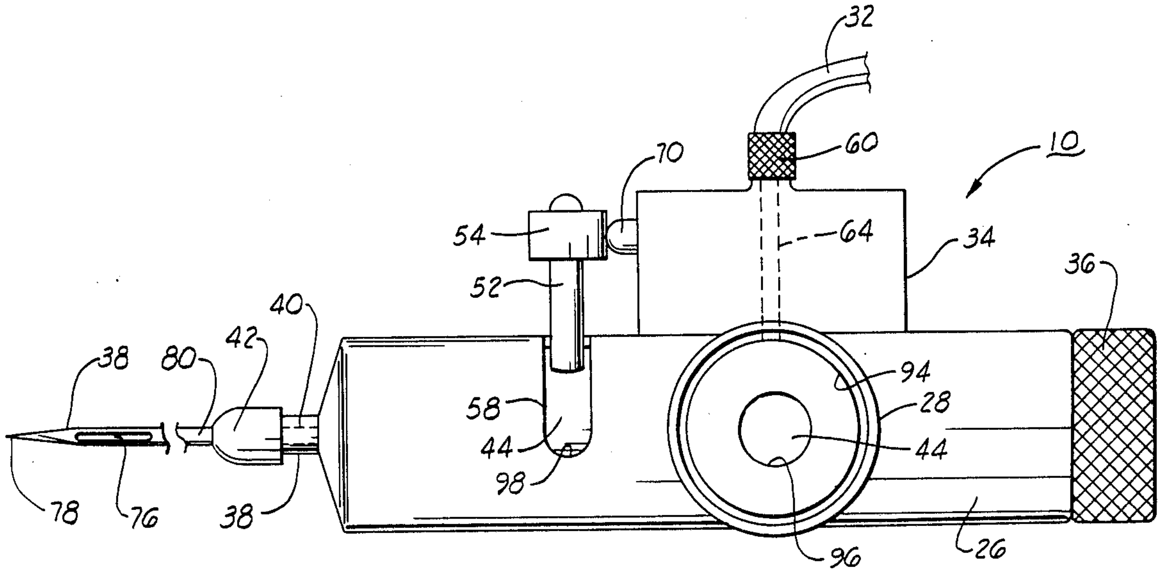
FIG. 2 is a top view of the dust applicator of the present invention.

Referring also to FIG. 2, the dust applicator 10 consists of a cylindrical frame 26 having an internally threaded collar 28 for detachably receiving a jar or canister 30 of pesticide. In particular, the collar 28 is adapted in one form to receive a commercially available blatticide sold under the trademark IN-CIDE PLUS TM. This is a powder composition made-up largely of boric acid but including active inert ingredients, an insecticide which is a very effective cockroach exterminator. It should be understood, however, that various forms of insecticide source container, commercially available or specialized, can be utilized in association with the dust applicator 10.

The dust applicator 10 receives operating air pressure from a suitable air pressure source 12 via a conduit 32 as input through an operating valve 34 that is mounted by suitable fasteners on the side of frame 26 (see FIG. 2). The air pressure source 12 may be any commercially available air source, for example a tankless air compressor, providing air pressure on the order of twenty to forty pounds per square inch. Dust applicator 10 includes a knurled rotator knob 36 for manual control and explusion of dust 14 from an applicator needle 38. Needle 38 is of a size enabling ready insertion through most wall materials in undetectable manner. Thus, the applicator needle 38 is a small diameter, on the order of 1/16 inch, in order to provide effective undetectable insertion.

Figure 3:
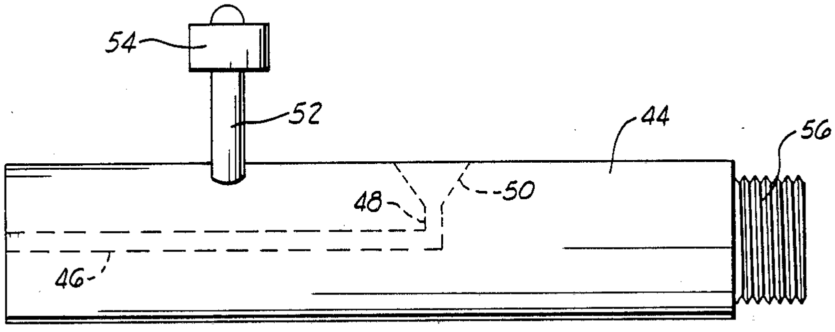
FIG. 3 is a plan view of a rotator barrel as utilized in the dust applicator of FIG. 2.
Figure 4:
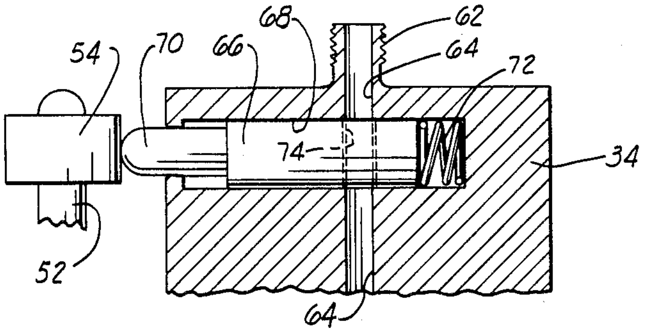
FIG. 4 is a sectional view of the pneumatic valve portion of the dust applicator of FIG. 2.

Referring more particularly to FIGS. 2, 3 and 4, the applicator frame 26 is formed with a front nozzle portion 38 including a radial bore 40. Nozzle portion 38 is adapted by threads, force-fit or the like to receive a cap portion 42 of needle 38 in secure engagement. The applicator frame 26 is a cylindrical structure and houses a rotator barrel 44 (FIG. 3) therein while maintaining the axial bore 40 in continual alignment with an axial bore 46 of rotator barrel 44. The axial bore 46 is formed in communication with a radial bore 48 and conical countersink 50 which is aligned relative to an actuating shaft 52. The actuating shaft 52 includes an actuator cam 54 formed thereon, and shaft 52 may be secured as by threaded affixure to extend radially from rotator barrel 44. Rearward threads 56 receive rotator knob 36 in assembly and knob 36 serves for manual rotation of rotator barrel 44 relative to the applicator frame 26, as will be further described below.

A slot 58 around approximately ¼ of the circumference of cylindrical frame 26 provides for extension of actuating shaft 52 therethrough as well as for quarter rotation movement of rotator barrel 44 within frame 26.

Referring more particularly to FIG. 4, air under pressure via conduit 32 (FIG. 2) is secured by a screw connector 60 to a threaded nipple 62 that is unitarily formed on valve block 34 in communication with an air control bore 64 that leads through cylindrical frame 26 to open at the rotator barrel 44. Passage of air through control bore 64 is controlled by a normally closed valve piston 66 that is reciprocally movable within an elongated, cylindrical cylinder 68 formed within valve block 34. The valve is shown in the open position as cam 54 is in position to urge a pin end 70 of piston 66 inward against a compression spring 72 to position transverse bore 74 in-line with control bore 64.

Figure 5:
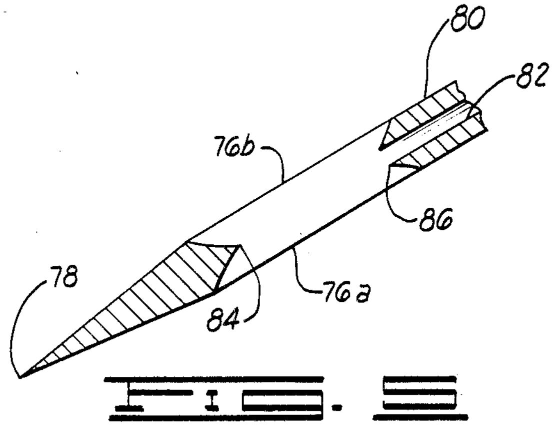
FIG. 5 is a view in section of an end portion of one form of dust applicator needle.
Figure 6:
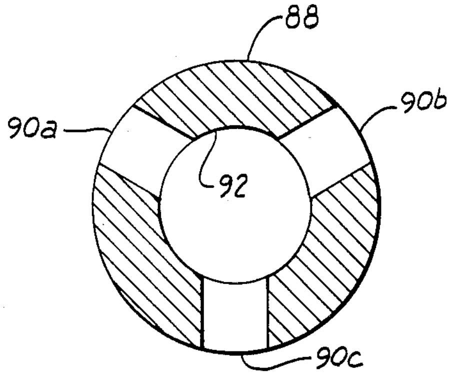
FIG. 6 is a cross section of an alternative form of dust applicator needle.

Referring to FIGS. 2 and 5, the applicator needle 38 is formed with an elongated release orifice 76 very near the tip end or needle point 78. This should then allow a body portion 80 of needle 38 to be of sufficient length to transverse the conventional thicknesses of wall cover and paneling materials. As shown in FIG. 5, the needle end may be formed with two opposed openings **76*a* and 76*b* in communication with a radial bore 82. It is important that the dust release slots 76*a* and 76*b* are each formed as a generally arcuate slot to form points 84, 86 in line with the interior bore 82. This slanted surface or acute angle formation helps to prevent clogging of the needle with insecticide dust since the particular crystalline nature of some dusts contribute to stacking and susceptibility to clogging. FIG. 6 shows an alternative form of needle end 88 which includes three, circumferentially equi-spaced dust release slots 90*a*, 90*b* and 90*c*. Here too, the slot formation is preferably arcuate in order to eliminate any radially aligned surfaces relative to an internal dust passage bore 92**.

The collar 28 (FIGS. 1 and 2) is formed on the applicator frame 26 to include internal threads 94 that are particularly adapted to receive mating thread engagement from such as canister 30; however, the type of reservoir and form of connection may vary considerably in accordance with the exigencies of usage. A wide inlet bore 96 is provided through frame 26 centrally of collar 28 to provide insecticide dust communication through to the frame chamber 97 and rotator barrel 44. That is, when the dust applicator 10 is in the load position with actuator shaft 52 rotated into contact with a shoulder 98 (FIG. 2) insectidical dust falls by gravity from canister 30 down within rotator barrel 44, as will be further described.

In operation, the dust applicator 10 is ready for use by attachment of canister 30 containing the selected form of dust insecticide. In a preferred form, and for specific use in cockroach elimination, a blatticide consisting largely of boric acid powder is utilized with application of air pressure from source 12 on the order of thirty pounds. The dust applicator 10 is then placed with applicator needle 38 through the wall section 18 for release of one or more charges of dust whereupon applicator 10 is then moved along a short distance, e.g. consonant with interior stud spacing, to place a next successive charge. Such periodic charging around the wall covering has proven to provide very effective extermination coverage. When the needle 38 is inserted at a crease or material interface such as the top of baseboard 20, the holes left from penetration are very nearly unnoticeable, and in the event that there is some objection they are easily covered over or removed by simple abrasion and/or paint filler practices. Actual boring of holes and removal of material is not necessitated.

The dust applicator 10 is charged with insecticide dust by moving actuator shaft 52 against shoulder 98 (FIG. 2) whereupon the conical countersink 50 (FIG. 3) of rotator barrel 44 is brought beneath inlet bore 96 (FIG. 2) so that dust from canister 30 falls therein. Thereafter, as actuator shaft 52 is moved peripherally away from shoulder 98 (FIG. 2), the countersink 50 with dust comes into communication with air pressure bore 64 and, simultaneously, the cam 54 urges pin end 70 of valve piston 66 inward against spring 72 (FIG. 4) to align valve bore 74 with control bore 64 so that air under pressure forces the insecticidal dust through bores 48, 46 and 40 for expulsion through holes 76 of the applicator needle 38. Actuation of the rotator barrel 44 may be effected by manual rotation of the knurled knob 36 as the operator proceeds with intermittent charging and expulsion of dust at selected positions along a void space.

The foregoing discloses a novel method and apparatus for enabling most complete and effective insecticide application procedures within building structures. The apparatus enables application of dust insecticide directly into void spaces in selected amounts without necessitating formation of holes or other destructive procedures. The technique of the present invention can be carried out more rapidly with less visible aftereffects than previous extermination procedures and, as particularly used for blatticide coverage in cockroach eradication, the technique embodies the maximum in safety and cleanliness.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. A method for application of dust insecticide within building structure void spaces, comprising:
   inserting a needle having an axial bore and a slot formed near the pointed end through a wall structure into a void space by manual force whereby the needle may be removed to expose only a barely visible puncture mark;
   forcing a charge of dust insecticide under air pressure through said axial bore for explusion in said void space; and
   repeating the steps of inserting the needle and forcing a charge of dust insecticide a multiple of times at selected intervals along said void space, whereby the total void space is effectively treated.

2. A method as set forth in claim 1 wherein said insecticide comprises:
   a blatticidal dust.

3. A method as set forth in claim 2 wherein:
   said blatticidal dust is comprised essentially of boric acid powder.

4. Apparatus for application of insecticide through paneling into building structure void spaces, comprising:
   a container including a selected insecticide;
   a needle having a hollow bore for effectively non-destructive insertion through said paneling into a void space, said needle including an elongated metal member defining an axial bore that extends from a cap end to proximate a pointed end and having at least one radially aligned, arcuately formed slot communicating with said bore proximate the pointed end;
   applicator means receiving a selected amount of insecticide from said container and being in communication with said needle bore; and
   a source of air pressure connected to said applicator means to expel said selected amount of insecticide through said needle bore into the void space.

5. Apparatus as set forth in claim 4 which is further characterized in that:
   the edge of the at least one slot nearest the pointed end forms an acute angle directed toward said axial bore.

6. Apparatus as set forth in claim 4 wherein said application means comprises:
   frame means defining a cylindrical chamber with end bore in communication with said needle bore and having an inlet bore communicating with said container;
   barrel means rotatably received in said chamber and including a bore therethrough in communication with said insecticide container and said frame means end bore; and
   valve means operable to apply air pressure from said source to dispel insecticide through said barrel means bore, said frame means end bore and said needle for deposition in the void space.

7. Apparatus as set forth in claim 6 wherein said barrel means comprises:
   an actuating shaft extending radially through said frame means and being adapted for limited arcuate movement with said barrel means;
   a radial bore disposed approximately co-planar to said control rod for receiving an input charge of insecticide; and
   an axial bore communicating said radial bore to said frame means end bore.

8. Apparatus as set forth in claim 7 wherein said valve means comprises:
   a normally closed valve disposed between said source of air pressure and said cylindrical chamber, said valve being actuated open when the actuating shaft is placed in a preselected position which also aligns the barrel means radial bore with the source of air pressure.

9. Apparatus as set forth in claim 7 wherein said valve means comprises:
   a valve block secured to said frame means approximately ninety degrees removed from said container inlet bore and having a control bore communicating between said source of air pressure and said frame means chamber; and
   a normally closed gate valve interposed in said control bore and extending a pin end from said valve block for contact with the barrel means actuating shaft thereby to urge the gate valve open coincidentally with positioning of said barrel means radial bore in communication with said control bore.

10. Apparatus as set forth in claim 8 wherein:
   said barrel means radial bore is formed to include a conical countersink for transferring a preselected amount of insecticide between said container input bore and said source of air pressure.

11. Apparatus as set forth in claim 9 wherein:
   said barrel means radial bore is formed to include a conical countersink for transferring a preselected amount of insecticide between said container input bore and said valve block contact bore.

* * * * *